(12) United States Patent
Boisseau et al.

(10) Patent No.: US 7,169,949 B2
(45) Date of Patent: Jan. 30, 2007

(54) SILANE-MODIFIED UV ABSORBERS AND COATINGS

(75) Inventors: John E. Boisseau, Bloomfield Hills, MI (US); Swaminathan Ramesh, Canton, MI (US)

(73) Assignee: BASF Corporation, Southfield, MI (US)

( * ) Notice: Subject to any disclaimer, the term of this patent is extended or adjusted under 35 U.S.C. 154(b) by 239 days.

(21) Appl. No.: 10/711,688

(22) Filed: Sep. 30, 2004

(65) Prior Publication Data

US 2006/0074153 A1    Apr. 6, 2006

(51) Int. Cl.
*C07F 7/10* (2006.01)
(52) U.S. Cl. .................. 556/419; 556/407; 556/420; 556/437; 556/465; 544/180; 528/25
(58) Field of Classification Search .................. None
See application file for complete search history.

(56) References Cited

U.S. PATENT DOCUMENTS

| 5,185,445 | A | * | 2/1993 | Meuwly et al. ............. 544/216 |
| 5,364,749 | A | * | 11/1994 | Leppard et al. ............. 430/507 |
| 6,350,526 | B1 | | 2/2002 | Johnson et al. |
| 2004/0181007 | A1 | | 9/2004 | Acevedo et al. |
| 2004/0185296 | A1 | | 9/2004 | Mazzanti |

FOREIGN PATENT DOCUMENTS

EP    0 339 262 A2    3/1989

OTHER PUBLICATIONS

Notification of Transmittal of the International Search Report and Written Opionion for PCT/US2005/030455, Aug. 25, 2005.

\* cited by examiner

*Primary Examiner*—Marc S. Zimmer

(57) ABSTRACT

Including a triazine UV light absorber having a silane group in a coating improves scratch and mar resistance after weathering.

15 Claims, No Drawings

SILANE-MODIFIED UV ABSORBERS AND COATINGS

BACKGROUND OF THE INVENTION

Automotive finishes are applied in a series of coating layers, with each coating layer providing an important function in the performance of the composite finish. For instance, primer coating layers are used to protect the substrate from corrosion, chipping, and delamination of the coating from the substrate. Surfacer and primer surfacer layers are commonly used to provide a smooth surface upon which to apply the topcoat layers, and may add increased corrosion protection or chip protection. The topcoat layers provide beauty as well as protection against scratching, marring, and environmentally-induced degradation.

The topcoat coatings may be applied as a single, colored layer, but today most OEM automotive topcoats are applied in two coating layers—a colored basecoat layer and a transparent clearcoat layer. Automotive clearcoats have many performance requirements. They must be smooth and glossy to provide the desired aesthetic appeal. They must also be durable, both to preserve the coating appearance and to protect the steel substrate, by resisting scratching and marring and also degradation from UV light in sunlight, environmental etching, and heat.

Two of the most important functions of an automotive topcoat are resistance to weathering, including resistance to environmental etch, and resistance to scratch and mar. Clearcoat coatings lose both resistance to environmental etch and resistance to scratch and mar due to photooxidation of the coating surface during outdoor weathering. Ultraviolet light (UV) absorbers are used to prevent photooxidation, but these are incorporated throughout the coating, not just at the surface where environmental etch, scratch and mar occur. The UV absorbers are costly; it is expensive to use more UV absorber in the coating than is used or needed. Further, because they are not bonded to the coating layers, the UV absorbers tend to be lost from the coating surface, with consequent loss of protection from photooxidation.

Thus, it would be desirable to be able to reduce the amount of UV absorber used in the coating while at the same time using the UV absorber more effectively and with better retention in the coating during weathering.

SUMMARY OF THE INVENTION

The present invention provides a triazine UV absorber having a silane group and a coating composition containing the silane-modified, traizine UV absorber, preferably a topcoat coating composition, and particularly preferably a clearcoat coating composition.

In one embodiment, the UV absorber having a silane group is the reaction product of an isocyanate-functional silane and an active hydrogen-functional triazine UV absorber.

In another embodiment, the triazine UV absorber having a silane group is the reaction product of a diisocyanate, an active hydrogen-functional triazine UV absorber, and a hydroxyl-functional silane.

The invention further provides a coated substrate, in which the uppermost coating on the substrate includes a triazine UV absorber having a silane group. The coated substrates of the invention have better original (that is, before weathering) scratch and mar resistance and better weathered scratch and mar resistance. The coated substrates of the invention also have improved environmental etch resistance. Because the triazine UV absorber with the silane modification tends to migrate to the coating surface during film formation, one may use less of the UV absorber in the coating composition than if the UV absorber were unmodified or modified in a different way.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

Any substance that absorbs energy in the UV region can be called a UV absorber. Typically, the UV absorbers used in coating compositions undergo a reversible chemical re-arrangement when in contact with wavelengths of UV light, and dissipate the energy as heat or infrared energy. UV light absorbers of the invention include a triazine ring substituted so as to be capable of converting UV light to other less energetic forms and further substituted with a substituent that can be reacted with a silane molecule. Preferred triazine UV light absorbers used to make the UV absorbers of the invention have an active hydrogen available for reaction with an isocyanate group. Particular compounds that may be used include, without limitation, 2-[4-[2-hydroxy-3-dodecyloxypropyl)oxy]-2-hydroxyphenyl]-4,6-bis(2,4-dimethylphenyl)-1,3,5-triaze2-[4-[2-hydroxy-3-tridecyloxypropyl)oxy]-2-hydroxyphenyl]-4,6-bis(2,4-dimethylphenyl)-1,3,5-triazine, and blends of these two compounds (commercially available from Ciba as Tinuvin 400).

A silane group may be introduced into the triazine UV absorber by reaction of the active hydrogen functionality of the UV absorber with an isocyanate-functional silane compound. Suitable examples of isocyanatoalkyltrialkoxysilane compounds include, without limitation, isocyanatopropyltrimethoxysilane, isocyanatopropylmethyidimethoxysilane, isocyanatopropylmethyidiethoxysilane, isocyanatopropyltriethoxysilane, isocyanatopropyltriisopropoxysilane, isocyanatopropylmethydiisopropoxysilane; isocyanatoneohexyltrimethoxysilane, isocyanatoneohexyldimethoxysilane, isocyanatoneohexydiethoxysilane, isocyanatoneohexyltriethoxysilane, isocyanatoneohexyltriisopropoxysilane, isocyanatoneohexyldiisopropoxysilane, isocyanatoisoamyltrimethoxysilane, isocyanatoisoamyldimethoxysilane, isocyanatoisoamylmethyidiethoxysilane, isocyanatoisoamyltriethoxysilane, isocyanatoisoamyltriisopropoxysilane, and isocyanatoisoamylmethyidiisopropoxysilane. Many isocyanatoalkyltrialkoxysilane compounds are sold under the trademark SILQUEST® by Crompton OSi Specialties, Inc., a subsidiary of Witco Corp.

In another embodiment, a silane group may be introduced into the UV absorber by reaction of the active hydrogen functionality of the UV absorber with one isocyanate group of a diisocyanate compound and reaction of an active hydrogen group of a silane compound (e.g., a hydroxyl group or an amine group) with the other isocyanate group of the diisocyanate compound. Suitable examples of active hydrogen-functional silane compounds include, without limitation, gamma-aminopropyltriethoxysilane (Silquest® A-1100), gamma-aminopropyltrimethoxysilane (Silquest® A-1110), hydroxy group-containing polyester-modified polydimethylsiloxanes (such as BYK® 370, 373 and 375 available from BYK Chemie), and hydroxy,dimethylsiloxane-polyesters (such as BYK® 310 and Byk®-LPG 6962). Particularly preferred is the hydroxy,dimethylsiloxane-polyester sold by BYK Chemie as Byk® -LPG 6962. Suitable examples of diisocyanate compounds include, without limitation, aliphatic diisocyanates such as ethylene diisocyanate, 1,2-diisocyanatopropane, 1,3-diisocyanatopropane, 1,6-diisocyanatohexane (hexamethylene diisocyanate or HMDI), 1,4-butylene diisocyanate, lysine diisocyanate, 1,4-methylene bis-(cyclohexyl isocyanate) and isophorone diisocyanate (IPDI), and aromatic diisocyanates and arylaliphatic diisocyanates such as the various isomers of toluene diisocyanate, meta-xylylenediiosycanate and para-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate. In addition, the various isomers of α,α,α',α'-tetramethyl xylylene diisocyanate can be used. Preferred diisocyanate compounds include isophorone diisocyanate, toluene diisocyanate, and 1,2-diisocyanatopropane.

The reaction of the isocyanate with the active hydrogen groups may be carried out under suitable reaction conditions. Representative reaction conditions include, without limitation, reaction in solvent that does not have an active hydrogen, reaction at temperatures of about 20° C. to about 130° C., and reaction in the presence of suitable catalysts for isocyanate reactions, such as dibutyl tin oxide and dibutyl tin dilaurate.

In one embodiment, the UV absorber of the invention is compound having a structure

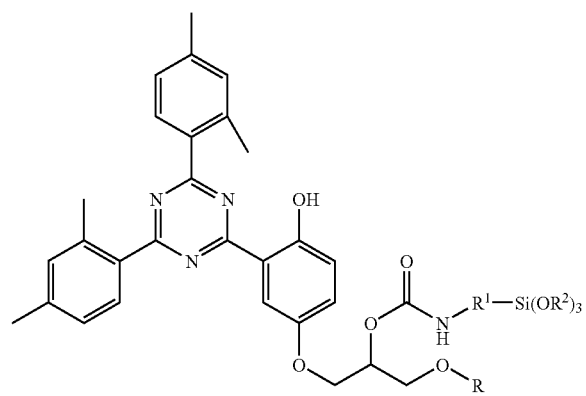

in which R is H, or an alkyl having from 1 to 12 carbon atoms, $R^1$ is an alkylene of 1 to 8 carbon atoms, and $R^2$ is an alkyl group having 1 to 6 carbon atoms.

The invention also provides a coating composition containing the triazine UV absorber having a silane group, preferably a topcoat coating composition, and particularly preferably a clearcoat coating composition. The coating composition may have, besides the triazine UV absorber having a silane group, other UV absorbers without silane groups, many examples of which are commercially available. The total amount of UV absorbers in the coating (combined amounts of triazine UV absorbers with a silane group and other UV absorbers) is preferably between 0.2–5% by weight of the coating composition The coating composition contains preferably at least about 0.1 weight percent, more preferably at least about 0.5 weight percent, and still more preferably at least about 1 weight percent of the triazine UV absorber having a silane group. The coating composition contains preferably up to about 5 weight percent, more preferably up to about 2 weight percent, and still more preferably up to about 1.5 weight percent of the triazine UV absorber having a silane group.

The coating compositions of the present invention includes a film-forming polymer or resin. Suitable examples of such film-forming polymers and resins include, without limitation, polyesters. acrylic polymers, polyurethane polymers, polycarbamate compounds, and polyepoxide resins. Many suitable film-forming polymers and resins are described in the literature.

The coating compositions of the present invention preferably also include a crosslinker component. The crosslinker component includes one or more crosslinkers reactive with active hydrogen functionality. Examples of crosslinkers reactive with active hydrogen functionality include, without limitation, materials having active methylol or methylalkoxy groups, including aminoplast resins or phenol/formaldehyde adducts; blocked polyisocyanate curing agents; tris(alkoxy carbonylamino) triazines (available from Cytec Industries under the tradename TACT); and combinations thereof. Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Non-limiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are water miscible or water soluble. Examples of blocked polyisocyanates include isocyanurates of toluene diisocyanate, isophorone diisocyanate, and hexamethylene diisocyanate blocked with a blocking agent such as an alcohol, an oxime, or a secondary amine such as pyrazole or substituted pyrazole.

The crosslinker component preferably is from about 2% by weight to about 45% by weight, and more preferably from about 10% by weight to about 35% by weight, and particularly preferably about 25% to about 35% by weight of the combined nonvolatile weights of the film-forming materials.

The coating compositions may include one or more catalysts. The type of catalyst depends upon the particular crosslinker component composition utilized. Useful catalysts include, without limitation, blocked acid catalysts, such as para-toluene sulfonic acid, dodecylbenzene sulfonic acid, and dinonyinaphthylene disulfonic acid blocked with amines; phenyl acid phosphate, monobutyl maleate, and butyl phosphate, hydroxy phosphate ester; Lewis acids, zinc salts, and tin salts, including dibutyl tin dilaurate and dibutyl tin oxide.

The coating compositions may be solventborne or, preferably, waterborne. Suitable solvents for solventborne compositions include, without limitation, Aromatic 100, n-methylpyrrolidone (NMP), propyl propasol, ketone solvents like methylisobutyl ketone and methylamyl ketone, alcohol solvents like butyl glycol and butyl glycol methyl ether, and ester solvents like amyl acetate, butyl acetate, and butyl cellusolve acetate. Waterborne compositions may include, in addition to water, organic cosolvents such as, without limitation, NMP, butyl glycol, butanol, methyl propyl ketone, and so on.

A clearcoat composition of the invention typically is free of pigments, but a one-layer topcoat would include one or more pigments. The pigment or pigments may be any organic or inorganic compounds or colored materials, fillers, metallic or other inorganic flake materials such as pearlescent mica flake pigments or metallic flake pigments such as aluminum flake, and other materials of kind that the art normally includes in such coatings. Pigments and other insoluble particulate compounds such as fillers are usually used in the topcoat coating compositions in an amount of 1% to 200%, based on the total solid weight of binder components (i.e., a pigment-to-binder ratio of 0.01 to 2).

Other conventional materials, such as flow control or rheology control agents, antioxidants, hindered amine light absorbers, and so on may be added to the compositions.

The coating compositions of the present invention are preferably applied as clearcoats on automotive articles, such as metal or plastic automotive bodies or elastomeric fascia, over a basecoat coating layer. It is preferred to have a layer of a primer surfacer before application of the basecoat coating layer. The clearcoat composition is preferably applied wet-on-wet over the basecoat composition. Crosslinking compositions are preferred for forming the basecoat layer. Coatings of this type are well-known in the art and include waterborne compositions as well as solventborne compositions. Polymers known in the art to be useful in basecoat compositions include, without limitation, acrylics, polyurethanes, polyesters, alkyds, and combinations of these. Acrylics and polyurethanes are preferred. Thermoset clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above. In one embodiment, waterborne clearcoat compositions having low volatile organic content are used. The waterborne clearcoat compositions preferably has a volatile organic content of less than about 1.5, more preferably less than about 1.3, and even more preferably less than about 0.7.

Each layer of the composite coatings of the invention can be applied to an article to be coated according to any of a number of techniques well-known in the art. These include, for example, spray coating, dip coating, roll coating, curtain coating, and the like. If an initial electrocoat primer layer is applied to a metallic substrate, the electrocoat primer is applied by electrodeposition. For automotive applications, the primer surfacer coating composition, basecoat composition of the invention, and the clearcoat composition layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

Basecoat-clearcoat topcoats are usually applied wet-on-wet. The compositions are applied in coats separated by a flash, as described above, with a flash also between the last coat of the basecoat composition and the first coat the clearcoat composition. The two coating layers are then cured simultaneously. Preferably, the cured basecoat layer is 0.5 to 1.5 mils thick, preferably a thickness at least to hiding, and the cured clear coat layer is 1 to 3 mils, more preferably 1.6 to 2.2 mils, thick.

The coating compositions described are preferably cured with heat. Curing temperatures are preferably from about 70° C. to about 180° C., and particularly preferably from about 170° F. to about 200° F. for a composition including an unblocked acid catalyst, or from about 240° F. to about 275° F. for a composition including a blocked acid catalyst. Typical curing times at these temperatures range from 15 to 60 minutes, and preferably the temperature is chosen to allow a cure time of from about 15 to about 30 minutes. In a preferred embodiment, the coated article is an automotive body or part.

The invention is further described in the following examples. The examples are merely illustrative and do not in any way limit the scope of the invention as described and claimed.

EXAMPLES

Example 1

Preparation of Triazine UV Absorber of the Invention 182 g of Tinuvine® 400 (hydroxyl equivalent weight 647 g/NV, 85% NV solution in an alcoholic solvent, obtained from Ciba) was vacuum stripped to remove the solvent. To the solid Tinuvin® 400 was added 49 g of Silquest® A-link 35 (isocyanate equivalent weight 205 g/NV, obtained from Compton OSi Specialties). One drop of dibutyl tin dilaurate and 30 g of Aromatic 100 solvent were also added. The reaction mixture was heated to 85° C. and held for two hours at that temperature. Titration of the reaction mixture for isocyanate showed that all isocyanate had reacted. The product was 85% non-volatiles and had molecular weights measured by gel permeation chromatography (GPC) of $M_n$ 1095, $M_w$ 1260, and polydispersity 1.15. The GPC trace showed a small amount (about 15%) of high molecular weight material.

Example 2

Preparation of Triazine UV Absorber of the Invention 16.8 g of hexamethylene diisocyanate (HDI) was combined with 70 g of Byk® LP G962 (a sylyl ester with a terminal, primary hydroxyl group) and one drop of dibutyl tin dilaurate. The mixture was heated to 75° C. and held for 2 hours at that temperature, when the isocyanate was found to be 50% reacted. Then, 64.7 grams of Tinuvin® 400 (100% nonvolatile) was added along with 70 g of 1-methoxy,2-propanol acetate, and the mixture heated to 80° C. and held for 2 hours at that temperature. Titration showed that all the isocyanate functionality was reacted. The silylated ultraviolight light absorber product was 49% nonvolatile.

Example 3

Preparation of Coating Composition of the Invention

A coating composition was prepared by combining 52.5 parts by weight of a carbamate-functional, modified acrylic resin, 14.55 parts by weight of a carbamate-functional oligomer, 18.55 parts by weight of a melamine formaldehyde resin, 1.2% of a blocked acid catalyst solution, 5.7 parts by weight of a rheology control additive, 0.8 parts by weight of Tinuvin® 400, 1.5 parts by weight of Tinuvin® 123, 2.1 5 parts by weight of Tinuvin® 928, 1.85 parts by weight of a coatings additive package, and 1.2 parts by weight of the UV Absorber of Example 1.

Comparative Example A

Coating Composition for Comparison to Examples 4 and 5

A comparative coating composition was prepared as in Example 3, but omitting the UV Absorber of Example 1.

Coating Composition 3 of the invention and the Comparative Example A were tested for scratch and mar resistance before and after weathering (400 hours weatherometer) according to the nanoindenter test developed by Ford Motor Company. The nanoindenter test used a small indenter to apply a scratch typically about 2 mm long using a force of 0 to 40 millinewtons (mN) to the test panel. The scratch is analyzed with a high-powered camera under a microscope to detect that force level required to fracture the film. The instrument also provides the scratch depth (called plastic deformation, pd) as the force applied to the indenter is increased, usually taken at 5 mN force. A coating with higher force required to fracture it and a lower plastic deformation value has better scratch resistance. The Ford test averages the test data for unweathered and weathered coating. The test panel is weathered either by 3 months exposure in Florida or by 400 hours exposure in a weatherometer (WOM). The Ford rating criteria is from Level 3 (best) to Level 1 (worst).

| Level | Load  | pd    | Comment                                  |
|-------|-------|-------|------------------------------------------|
| 3     | >13.0 | <0.35 | best in class paint system performance   |
| 2     | >8.0  | <0.40 | comparable with competitive technologies |
| 1     | >6.0  | <0.50 | minimum customer acceptance              |

The coating compositions were applied as clearcoat layers over a commercially available basecoat composition and cured for 25 minutes at a metal temperature of 275° F. The coating compositions were then tested with the nanoindenter before and after weathering. The Nanoindenter & Scratch Resistance are given in the table below.

| Coating Composition | Before Weathering load | Before Weathering Pd | After WOM load | After WOM pd | Average load | Average pd | Ford Rating |
|---|---|---|---|---|---|---|---|
| Example 3 | 14.3 | 0.24 | 12.4 | 0.30 | 13.3 | 0.27 | 3 |
| Comparative Ex. A | 13.3 | 0.28 | 9.7 | 0.40 | 11.5 | 0.34 | 2 |

Therefore, use of the silane-modified UV absorbers improves scratch and mar resistance of the clearcoat. The clearcoat of Examples 3 had surface adhesion properties unchanged from Comparative Example A. The Example 3 clearcoat also had improved environmental etch resistance.

The description of the invention is merely exemplary in nature and, thus, variations that do not depart from the gist of the invention are intended to be within the scope of the invention. Such variations are not to be regarded as a departure from the spirit and scope of the invention.

The structure below is the structure referred to in claim 2. It is being inserted at this point in the specification because the electronic filing software would not allow a chemical structure to be inserted into the claim.

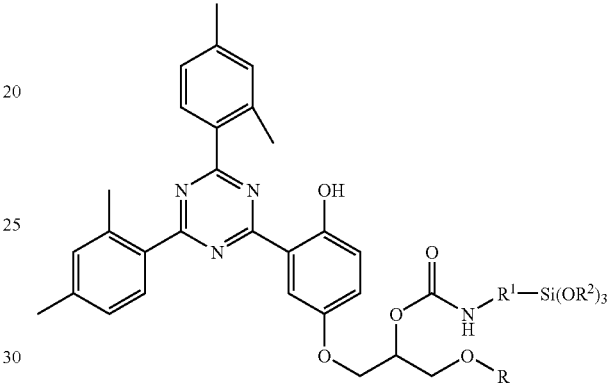

What is claimed is:

1. A triazine UV absorber comprising a silane group; wherein the silane group is linked to the triazine UV absorber by a urethane group.

2. A compound having a structure

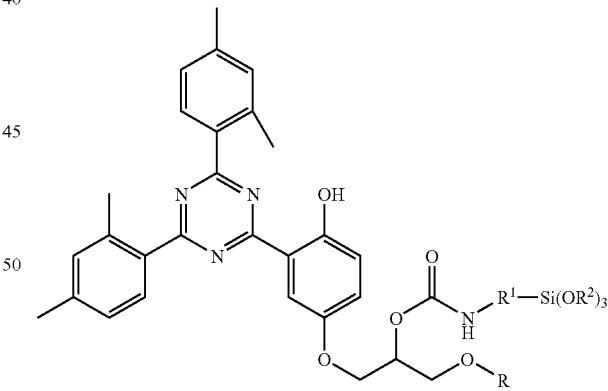

wherein R is H or an alkyl group having 1 to 12 carbon atoms, $R^1$ is an alkylene of 1 to 8 carbon atoms and $R^2$ is an alkyl group having 1 to 6 carbon atoms.

3. The reaction product of an isocyanate-functional silane compound with an active hydrogen-functional triazine UV absorber compound.

4. The reaction product of an active hydrogen-functional triazine UV absorber compound and an active hydrogen-functional silane compound with a diisocyanate.

5. The reaction product of claim 4, wherein the active hydrogen-functional silane compound has a hydroxyl group.

6. The reaction product of claim 4, wherein the active hydrogen-functional UV absorber compound has a hydroxyl group.

7. A coating composition containing a compound according to claim 1.

8. A coating composition containing a UV absorber according to claim 2.

9. A coating composition containing a UV absorber according to claim 3.

10. A coating composition containing a compound according to claim 4.

11. A coating composition according to claim 7, wherein the coating composition is a clearcoat coating composition.

12. A coated substrate, comprising an outermost layer that is a clearcoat layer obtained from a coating composition according to claim 7.

13. A coated substrate, comprising an outermost layer that is a clearcoat layer obtained from a coating composition according to claim 8.

14. A coated substrate, comprising an outermost layer that is a clearcoat layer obtained from a coating composition according to claim 9.

15. A coated substrate, comprising an outermost layer that is a clearcoat layer obtained from a coating composition according to claim 10.

* * * * *